June 10, 1952

L. D. SMULLIN 2,600,278

VARIABLE CAPACITY CAVITY TUNING

Filed Aug. 2, 1945

INVENTOR
LOUIS D. SMULLIN

BY Ralph L. Chappell

ATTORNEY

Patented June 10, 1952 2,600,278

UNITED STATES PATENT OFFICE 2,600,278

VARIABLE CAPACITY CAVITY TUNING

Louis D. Smullin, Arlington, Mass., assignor, by mesne assignments, to the United States of America as represented by the Secretary of the Navy Application August 2, 1945, Serial No. 608,592

3 Claims. (Cl. 178—44)

This invention relates to resonant cavity tuners and more specifically to a tuning device for tuning a resonant cavity by varying the capacitance of the cavity without appreciably lowering the inductance thereof.

A particular object of this invention is to provide a resonant cavity tuner which accomplishes tuning by changing the capacitance of the cavity to be tuned.

A more particular object of this invention is to provide a resonant cavity tuner for varying the capacitance of the resonant cavity without appreciably changing the inductance thereof.

Figure 1:
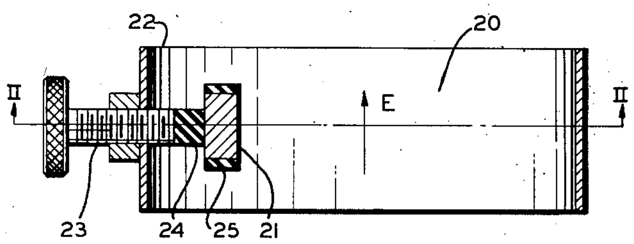
Figure 2:
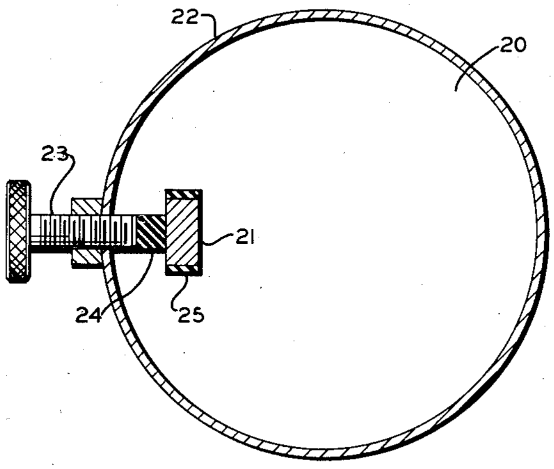
Figure 3:
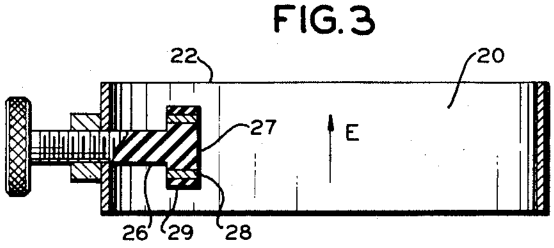

Further objects and advantages of this invention, as well as its construction, arrangement, and operation, will be apparent from the following description and claims in connection with the accompanying drawings, in which, Fig. 1 is a schematic diagram of one embodiment of the invention, Fig. 2 is a sectional view taken along the lines II—II of Fig. 2, Fig. 3 is a schematic diagram of a second embodiment of the invention.

Referring to Fig. 1 there is shown a resonant cavity 20, and means for varying the capacitance of the cavity in the form of a disc-shaped member 21 formed of an electrically conductive material, and preferably of such a material having a low electrical resistance. While brass, copper and silver may be used to form the disc, a silver disc is preferable. As shown, member 21 may be adjustably mounted to one of the walls 22 inclosing cavity 20 by means of a lead screw 23 in order that the position of member 21 may be varied in cavity 20 as may be desirable. A dielectric extension 24, preferably formed of polystyrene, is provided to electrically insulate member 21 from lead screw 23 and to provide means for mounting member 21 to said lead screw. An insulating sleeve 25 of dielectric material, preferably polystyrene, is mounted on the circumference of disc 21 to prevent electrical short circuits from member 21 to wall 22. While a lead screw is illustrated as a means for varying the position of member 21 in said resonant cavity 20, other means such as a sliding stem may be used to accomplish this purpose.

In operation, silver tuning member 21 effectively shortens the length of the electric field lines between the top and bottom of cavity 20, while the polystyrene sleeve 25 increases the average dielectric constant of the path. Both of these effects are additive to increase the capacitance of cavity 20. Inasmuch as the current path across the face of member 21 is relatively short and has a very small inductance, the net effect is to lower the resonant frequency of the cavity. As the stem is rotated it moves further into the cavity into regions of increasingly higher field strength. As this operation takes place, the capacitive reactance decreases proportionately and the resonant frequency becomes steadily lower. The tuning member, being of circular form, does not vary as it is rotated so that tuning depends only on the lateral and not the rotational position of the tuning member.

Fig. 3 discloses a second embodiment of the invention in which the center portion of tuning member 21 of Fig. 1 has been removed. As shown, there is provided a dielectric stem 26 having a disc-shaped dielectric head 27 formed on the inner end thereof. A sleeve 28 of electrically conductive material is mounted on the circumference of head 27, while an insulating sleeve 29 of dielectric material is mounted on sleeve 28. As explained in connection with Fig. 1, the dielectric and electrically conductive members are preferably formed of polystyrene and silver respectively, although copper or brass may be used to form the tuning member.

As shown in Figs. 1 and 3, a vector designated by letter E indicates the instantaneous direction of an electric field which oscillates sinusoidally. It will readily be understood by reference to Figs. 1 and 3 that disc 21 and sleeve 28 are so oriented with respect to cavity 20 that the instantaneous direction of the oscillating electric field is perpendicular to the non-insulated surfaces of disc 21 and sleeve 28. In operation, the embodiment of Fig. 3 is similar to that of Fig. 1 although the tuning member of Fig. 1 is in the form of a disc, while that of Fig. 3 is in the form of a sleeve.

While two embodiments of this invention have been disclosed and described, it is to be understood that various modifications and changes may be made in this invention without departing from the spirit and scope thereof as set forth in the appended claims.

What is claimed is:

1. In combination, a cavity resonator formed of a substantially cylindrical conductive wall bounded by two substantially plane, parallel, conductive surfaces, the electric field vectors of the electromagnetic wave energy adapted to be contained in said resonator being substantially perpendicular to said plane conductive surfaces, and apparatus for tuning said cavity resonator to a desired frequency, said apparatus comprising a disc-shaped conductive member and a dielectric sleeve mounted on the circumference of said conductive member, a cylindrical dielectric member coaxially secured to one face of said disc-shaped member, and metallic positioning means coaxially joined to said cylindrical dielectric member and supported in said cylindrical wall of said resonator for varying the position of said disc-shaped member and said dielectric sleeve in a direction within said resonator parallel to said plane conductive surfaces, said tuning apparatus being so arranged that said disc-shaped member is substantially transverse to said plane conductive surfaces independently of its position within said resonator.

2. In combination, a cavity resonator formed of a substantially cylindrical wall bounded by two substantially plane, parallel, conductive walls, the electric field vectors of the energy adapted to be contained in said resonator being substantially perpendicular to said plane parallel walls, and apparatus for tuning said cavity resonator to a desired frequency, said apparatus comprising a disc-shaped conductive member and a dielectric sleeve mounted on the circumference of said conductive member, a dielectric cylinder coaxially secured to said disc-shaped member, and a metallic positioning screw threadably mounted in said cylindrical wall equidistantly from said parallel walls and extending radially into said resonator, said screw being coaxially joined to said dielectric cylinder for varying the position of said disc-shaped member within said resonator in a direction parallel to said plane conductive surfaces, said tuning apparatus being so arranged that said disc-shaped conductive member is maintained substantially transverse to said plane conductive surfaces of said resonator independently of its position in said resonator.

3. In combination, a cavity resonator having a cylindrical conductive side wall and plane, parallel conductive end walls, the electric vectors of oscillations adapted to be sustained therein being normal to said end walls and of greatest intensity at the center of said resonator, and tuning means for said resonator comprising a conductive lead screw threadably mounted in the cylindrical wall of said resonator and extending radially toward the center of said resonator, a coaxial extension of dielectric material secured to the inner end of said lead screw, a conductive circular disc coaxially secured to said dielectric extension whereby the faces of said disc are substantially parallel to the electric vectors of oscillations within said resonator, a dielectric sleeve mounted on the circumference of said disc, and means for rotating said lead screw whereby the faces of said disc may be adjustably positioned along a radius of said resonator, said disc and sleeve being effective to progressively increase the capacitance of said resonator and to lower its resonant frequency as it is moved toward the region of highest electric intensity.

LOUIS D. SMULLIN.

REFERENCES CITED

The following references are of record in the file of this patent:

UNITED STATES PATENTS

| Number | Name | Date |
|---|---|---|
| Re. 22,990 | Hansen | Mar. 23, 1948 |
| 1,674,258 | Obergfell et al. | June 19, 1928 |
| 2,132,208 | Dunmore | Oct. 4, 1938 |
| 2,281,717 | Samuel | May 5, 1942 |
| 2,401,489 | Lindenblad | June 4, 1946 |
| 2,406,402 | Ring | Aug. 27, 1946 |
| 2,408,895 | Turner | Oct. 8, 1946 |
| 2,417,542 | Carter | Mar. 18, 1947 |
| 2,442,671 | Tompkins | June 1, 1948 |